United States Patent [19]

Naylor

[11] 4,001,513
[45] Jan. 4, 1977

[54] METHOD AND APPARATUS FOR THE DETECTION OF FRAUDULENT TOLL TELEPHONE CALLS

[75] Inventor: David Charles Naylor, Georgetown, Canada

[73] Assignee: Northern Electric Company, Limited, Montreal, Canada

[22] Filed: July 31, 1975

[21] Appl. No.: 600,649

[52] U.S. Cl. .......................... 179/18 DA; 179/7 R
[51] Int. Cl.² ........................................ H04M 15/12
[58] Field of Search ............... 179/7, 7.1 R, 18 DA, 179/84 VF, 84 R

[56] References Cited
UNITED STATES PATENTS

| | | | |
|---|---|---|---|
| 3,306,984 | 2/1967 | Leonard | 179/84 VF |
| 3,349,191 | 10/1967 | Mann | 179/84 VF |
| 3,428,757 | 2/1969 | Roscoe | 179/84 VF |
| 3,433,902 | 3/1969 | Butcher et al. | 179/84 VF |

*Primary Examiner*—Kathleen H. Claffy
*Assistant Examiner*—Gerald L. Brigance
*Attorney, Agent, or Firm*—Frank Turpin

[57] ABSTRACT

Fraudulent toll telephone calls are detected by the recognition of extraneous supervisory signals which are generated in the originating office in response to a perpetrator placing such a call. The invention provides a means of detecting a second proceed-to-send signal received at the originating office and of recording in memory means the identities of the calling and called parties. Timing means for achieving the detection is connected to the automatic message accounting trunk circuit of the originating office and, upon detection, an MF receiver is also connected thereto for a predetermined interval of time.

11 Claims, 4 Drawing Figures

METHOD AND APPARATUS FOR THE DETECTION OF FRAUDULENT TOLL TELEPHONE CALLS

This application relates generally to telephone system and more particularly to the method and apparatus for the detection of fraudulent toll telephone calls.

It is generally recognized that a sizeable proportion of toll calls are fraudulent in nature. That is, these calls are placed in such a way that the automatic message accounting system of an originating toll office is induced into charging erroneously for the calls.

The most common method of placing fraudulent toll calls has been to use a so-called "blue box". This piece of apparatus which is coupled to the subscriber telephone set normally consists of an oscillator adapted to provide an output signal which simulates exactly the in-band single frequency control signal of the North-American toll telephone network, and a multifrequency (MF) generator including a set of pushbutton keys to simulate the MF signalling also used in the toll telephone network.

In order to use his blue box, the user accesses the direct distance dialling (DDD) network by placing a toll call to a called party in a near destination office and at the first ringing signals to the called party, the call is cancelled at the destination toll office by requesting service as for a new call, by using the blue box. This causes the equipment in the destination toll office to accede to the request by dropping the call in progress and by sending a second proceed-to-send signal to the originating office. The blue box user then keys a new called number to which the destination office reacts by routing the call to the called party. However all of the signalling which takes place from the cancellation of the first call to the routing of the call to the second called party appears on the speech path of the originating office. Therefore, the automatic message accounting system at the originating office is not aware of any changes in the original call and the blue box user only gets billed for a call to the near toll office which he originally accessed.

There have been numerous attempts at preventing and/or detecting the use of these blue boxes. The most common method of detecting the use of a blue box is the detection of a foreign single frequency control signal generated by the blue box and which appears at the trunk circuit of the automatic message accounting system. If a blue box is used, this foreign control signal will indeed appear on the speech path of the trunk circuit. However, because the control signal is an in-band signal, it must be differentiated from voice signals; otherwise speech signals will trigger the detection circuitry. This requires the use of very sophisticated, and therefore expensive, frequency separation and detection circuitry.

I have found that the detection of a blue box user may be made very simply, reliably and economically. Whenever a blue box user operates his device to cancel his first-dialled call, the equipment at the destination office responds by reconnecting a receiver/sender to the transmission path. The receiver/sender signals the originating office to send the called number by sending a second proceed-to-send signal on the transmission line.

This signal is detected and converted to a direct current supervisory signal by the outgoing single frequency unit of the originating office and fed back to the automatic message accounting trunk circuit because the system is expecting an off-hook control signal from the destination office. Since this supervisory signal is a direct current supervisory signal of a predetermined duration, it may be recognized with relative ease. Therefore, I have found that a fraudulent user of the toll system may be detected by detecting the presence of a second proceed-to-send signal at the originating office during any one toll call.

Following detection, the operating company has the option of causing the automatic message accounting system to record the ensuing fraudulent called number and thereby billing the calling party for his fraudulent call, and/or denying the calling party the use of the toll system by cancelling the call. In any case, the identity of the calling number may be identified by flagging the records of the message accounting system.

An example embodiment of the invention will now be described in conjunction with the drawings in which:

FIG. 1 is a block circuit diagram showing a portion of the telephone network. Only those parts of the system necessary to explain the invention are shown and all of the blocks within the system are well known to persons knowledgeable in the telephone art.

Figure 1:
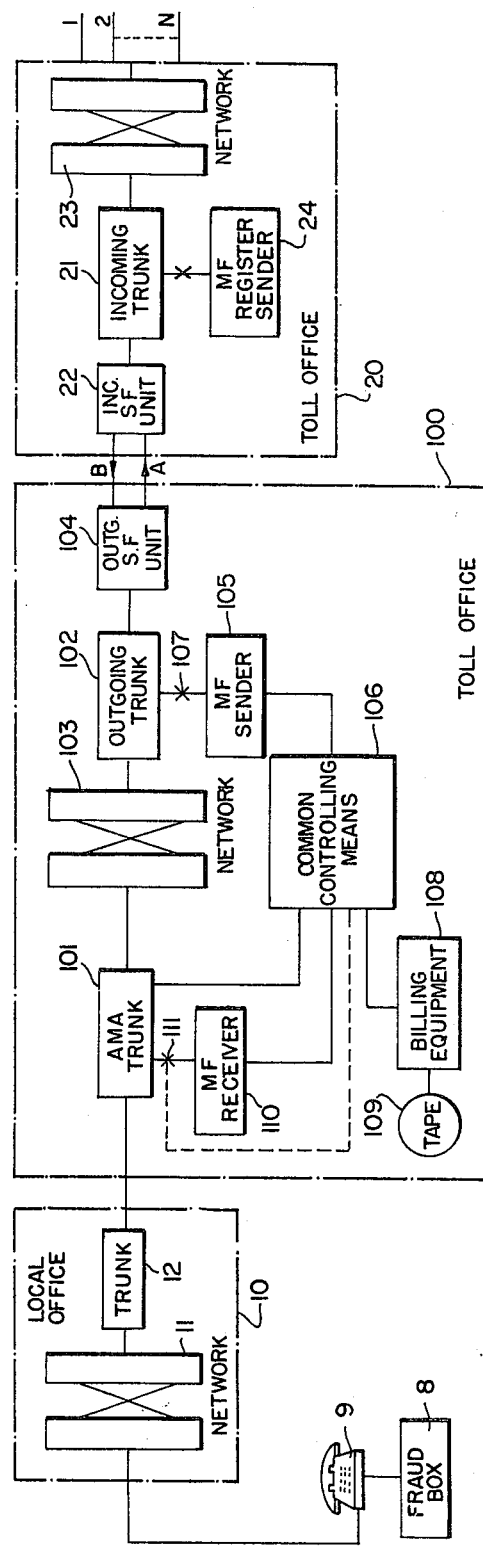
FIG. 1 is a block circuit diagram of a system in accordance with the invention.

FIG. 1 shows an originating toll telephone office 100 connected to a local telephone office 10, and a destination toll telephone office 20. The local office 10 is shown to comprise a switching network 11 and a trunk circuit 12 for connection of the local office 10 to the toll office 100. The local office 10 is also connected to a subscriber telephone set 9 which in turn is connected to a fraud box 8 (blue box).

The circuitry of the fraud box is presently well known in some circles since thousands of units are in use. It consists of an audio oscillator capable of providing an output signal which simulates exactly the in-band single frequency control signal used between toll offices of the North-American telephone network and a multifrequency (MF) generator including a set of pushbutton keys for emulating the MF signalling also used in the toll telephone network.

The toll office 100 is shown to comprise an automatic message accounting (AMA) trunk 101 for connection to the local office 10 and to an outgoing trunk 102 via a switching network 103. The outgoing trunk 102 is connected to an outgoing single frequency unit 104 and connectable to an MF sender 105 which is connected to a common controlling means 106 through a switch 107. The controlling means 106 controls the entire functioning of the office and transfers the information necessary for the billing of a toll call from the AMA trunk circuit 101 to billing equipment 108 which stores the billing information for subsequent processing in a memory means such as tape 109.

For purposes of describing the invention, an AMA trunk circuit is defined as that piece of apparatus which is responsive to supervisory signals necessary to the billing of a toll call. The configuration shown in toll office 100 is that which is conventional and common the the Electronic Switching Systems (ESS) of the Western Electric Company and the Stored Program Switching System of the Northern Electric Company (SP-1) when they are equipped with an automatic message accounting system (AMA). All of the above systems have been the object of numerous patents and have been extensively documented in the literature. Generally, a toll office such as block 100 serves as the gateway to the toll telephone network. It is accessed from a local office such as block 10 and accesses another toll office such as block 20. The supervisory information for controlling and billing the call to the calling subscriber appears at a trunk circuit such as the AMA trunk 101 and is made available for processing by the common controlling means 106 via a scanner circuit therein (not shown) which periodically samples the information appearing at the trunk 101. Through the use of well-known software techniques, the common controlling means 106 is able to determine the characteristics and the identity of the signals it receives from the trunk circuit 101.

The toll office 100 is shown to also have an MF receiver 110 connectable to the AMA trunk circuit 101 by a switch 111 controlled by the common controlling means 106. This receiver circuit may be a conventional multifrequency receiver such as are used extensively in telephone offices. Its function is to receive multifrequency signals and convert them to direct current voltage level signals. Its purpose in this system will be explained below.

The toll office 20 is shown to comprise an incoming trunk 21 connected to an incoming single frequency unit 22, to a switching network 23 and to an MF register/sender 24. The office 20 may be connected to other parts of the telephone network via a plurality of transmission paths 1, 2 . . . N and is connected to the toll office 100 via a transmission path having channels A and B — one for each direction of transmission.

OPERATION OF THE SYSTEM

Figure 2:
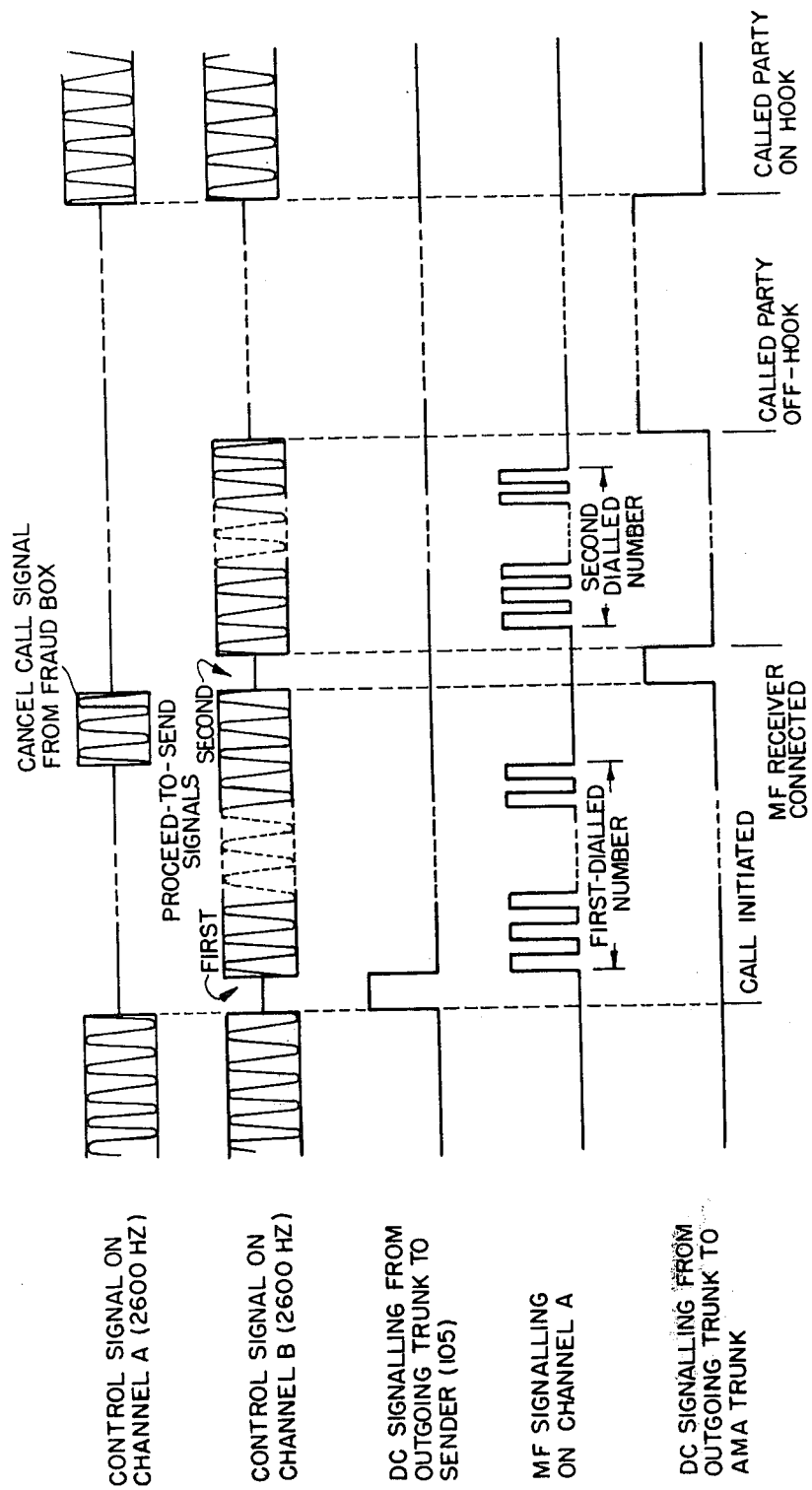
FIG. 2 is a waveform diagram illustrating control signals at various points in the system of FIG. 1.
Figure 3:
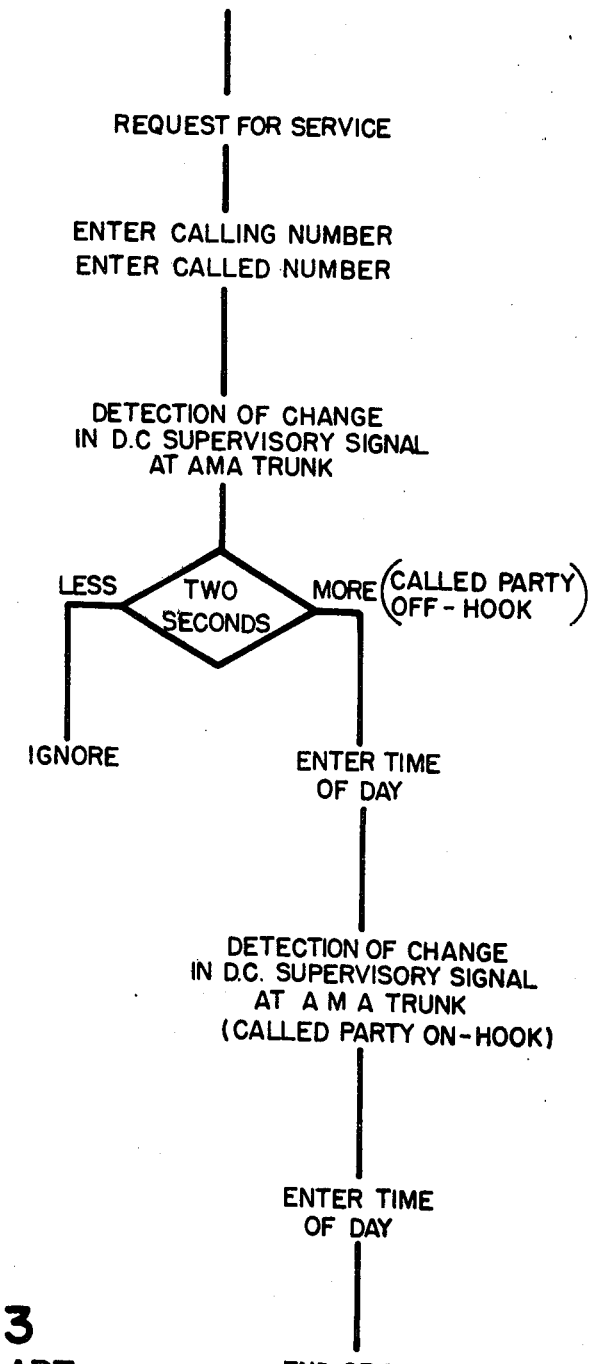
FIGS. 3 and 4 are sequence flow charts illustrating the operation of the system of FIG. 1 with and without the invention respectively.
Figure 4:
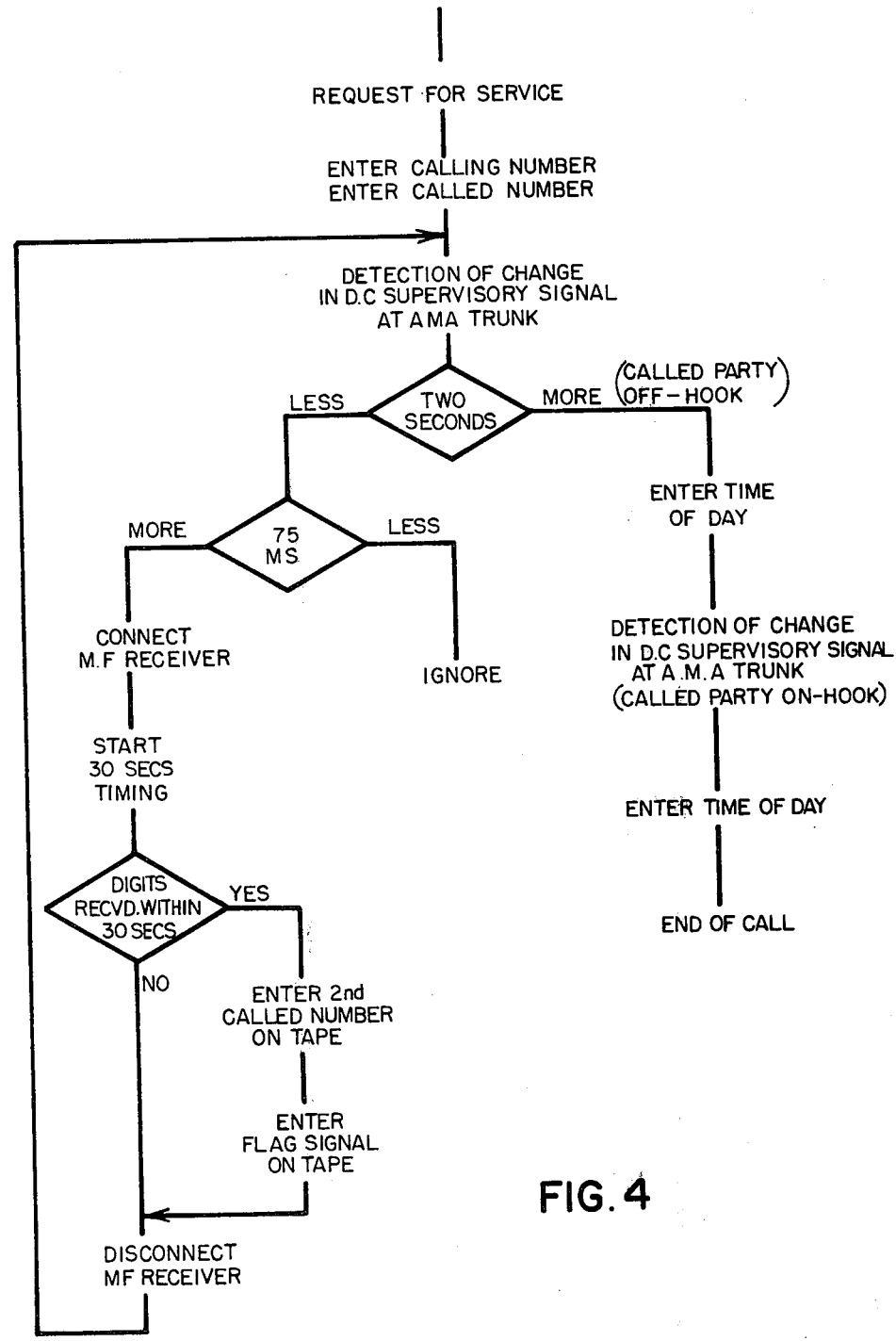

A clearer understanding of the operation of the system as it relates to the invention may be gained by reference to FIG. 2 of the drawings which is a waveform diagram of supervisory and control signals at various points in the system and to FIGS. 3 and 4 which are sequence flow charts illustrating the operational differences between a prior art system and the invention.

The subscriber initiates a long distance or toll call in the conventional manner, that is, by going off-hook and dialling the digit 1. This action causes the local office 10 to connect the subscriber's line through the network 11 and the trunk circuit 12 to the toll office 100. As the called number is dialled, the digits are recorded by the billing equipment 108–109 of the automatic message accounting system which also records the identity of the calling party. The called number is passed along to the multifrequency (MF) sender 105 attached to an outgoing trunk 102 which is connected to a destination toll office 20 via a transmission path having channels A and B, one for each direction of transmission, as is conventional in the toll telephone network.

The outgoing trunk 102 causes the outgoing single frequency (SF) unit 104 to remove the 2600 hertz control signal from channel A. The removal of this control signal informs the incoming single frequency (SF) unit 22 of the toll office 20 that a call is in progress and that service is requested. The incoming SF unit then causes the incoming trunk 21 to attach the register/sender 24 thereto. When the register/sender 24 is ready to receive the digits of the called number, it signals the incoming SF unit 22 which responds by momentarily removing the 2600 hertz control signal from channel B of the transmission path to the office 100. This is a proceed-to-send signal to the originating office. The duration of this break in signal is nominally 200 milliseconds. When it is removed for more than two seconds, the originating office interprets the removal as an indication that the called party has gone off-hook, e.g. that the called party has answered, and when it is removed for less than 75 milliseconds, it is interpreted as noise (hit on the line) and ignored.

The proceed-to-send signal is detected by the outgoing SF unit 104 which changes its direct current (DC) supervisory signal to the outgoing trunk 102. Because the MF sender 105 is still connected thereto, the outgoing trunk 102 passes this change in the supervisory DC signal to it instead of to the AMA trunk 101 which is waiting for an off-hook indication in order to start timing the call. The MF sender 105 recognizes the proceed-to-send signal and responds by sending the keypulse pair of tones followed by the called number digits, in the conventional manner. Upon completion of sending the called number, the MF sender 105 disconnects itself from the outgoing trunk 102.

The destination toll office 20 receives the called number digits and determines to where the call should be switched. When the connection to the called party is established, the called telephone rings.

The telephone set 9 of the calling party is now connected to the toll office 20 via the speech path of the local office 10, and the toll office 100 including the AMA trunk 101, the network 103, the outgoing trunk 102 and the outgoing SF unit 104 which is monitoring the channel B of the transmission path from the destination office for an off-hook signal to indicate that the called party has answered the call. This signal takes the form of the removal of the 2600 hertz signal from channel B. Upon detection of this removal, the outgoing SF unit 104 changes its DC supervisory signal to the outgoing trunk 102 which, because it is now disconnected from the MF sender 105, extends this signal back to the AMA trunk 101. This supervisory signal is detected by the common controlling means 106 and if it meets the criteria of an off-hook signal, e.g. if it is at least of 2 seconds duration, the billing equipment 108 is caused to start timing the call. If the change in supervisory signal is not of a duration long enough to be recognized as an off-hook signal, it is considered to be a "hit" or extraneous signal and is ignored.

All of the above operation is conventional and is common to the toll telephone network. There are variations in the type of equipment used to perform the detection and the timing but the functions are all similar. For example, a commonly used electromechanical system (number 5 crossbar) does not have a scanner attached to the AMA trunk but it is equipped with circuits for timing the duration of supervisory and control signals.

DIALLING OF A FRAUDULENT TOLL CALL

The fraud perpetrator enters the picture when the called party's telephone starts to ring. At this time, the perpetrator uses his fraud box 8 to transmit a 2600 hertz tone signal unto the telephone circuit (speech path) towards the destination office 20. The incoming SF unit 22 receives this signal and interprets it to be an on-hook or disconnect signal from the originating office. The SF unit 22 responds by changing its DC supervisory signal to the incoming trunk 21 to indicate on-hook and this causes release of the connection to the called number. However, the connection from the fraud box user's telephone set 9 to the outgoing SF unit 104 remains established due to the use of the DC supervision on this part of the connection which is controlled by the calling party's telephone set 9 being off-hook. At this time, the AMA billing equipment is still expecting an off-hook signal from the destination office.

The fraud box user now removes the 2600 hertz tone signal from the telephone line. The incoming SF unit 22 interprets this removal of tone as a request for service and causes a second proceed-to-send signal to be transmitted back to the outgoing SF unit 104, which changes its DC supervision to the outgoing trunk 102. Because the sender 105 is not connected thereto, the outgoing trunk 102 extends the change in supervisory signal which corresponds to the second proceed-to-send signal to the AMA trunk circuit 101. The presence of this signal appearing at the AMA trunk circuit 101 is ignored because the billing equipment is waiting for an answer indication which is an off-hook signal of at least 2 seconds.

The fraud box user hears switching equipment noise in the telephone set receiver due to the attachment of the register/sender 24 and the return of the second proceed-to-send signal. The perpetrator now uses his fraud box 8 to transmit the MF tones corresponding to a new called number. The AMA system does not become aware of these signals because they appear on the speech path of office 100. The MF tones pass through the telephone circuit to the destination office register/sender 24 which causes a connection to be established to the new called number in the conventional manner.

When the telephone set of the new called number is answered, an off-hook signal is returned to the AMA trunk circuit 101 where, if it is maintained for a duration longer than 2 seconds, it is recognized as an answer indication of the called party by the billing equipment which records the answer indication and the time of day. However, the billing equipment associates this answer indication with the number originally dialled from the use's telephone set 9. Therefore, the user of telephone set 9 is being charged at the rate corresponding to his first-dialled call. If this call was directed at a near toll office whereas his second-dialled call was directed at a far toll office, the difference in charges can be very significant.

Several methods have been proposed to intercept these fraudulent calls. As described above, the commonly used method consists of detecting the 2600 hertz tone signal which the fraud box user transmits to cancel his first-dialled call at the destination office. However, as discussed previously, this method requires very sophisticated and expensive frequency separation and detection circuitry because at the time and location that the signal is being looked for, voice signals having similar frequency components may be on the speech path if a fraudulent call is not being dialled.

DETECTION OF FRAUDULENT TOLL CALL

When the fraud box user transmits his 2600 hertz tone signal to cancel his first-dialled call at the destination office 20, a second proceed-to-send signal is returned to the outgoing SF unit 104 on channel B of the transmission path. This signal causes a change in the DC supervisory signal to the AMA trunk 101. Established criteria of operation dictates that this signal must have a nominal duration of 200 milliseconds; that is, greater than 75 milliseconds and less than 2 seconds (FIGS. 3 and 4). Therefore, the detection of this second proceed-to-send signal is achieved by providing the detection circuitry attached to the AMA trunk 101 with the capability of detecting a DC signal meeting these limits. In the system embodiment described above, the timing of the programs controlling the detection of supervisory signals at the trunk circuit 101 by the common controlling means 106 is altered to provide the detection and recognition of the second proceed-to-send signal. These additions to the programs are reflected in the differences between the sequence flow charts of FIGS. 3 and 4. These altered programs provide a means of detecting these fraudulent toll calls. Similarly, in electromechanical systems, the timing circuits of the detection circuits may be altered to provide the detection of this fraudulent proceed-to-send signal.

When the fraudulent second proceed-to-send signal is detected at the originating office, a number of options are opened to the operating telephone company.

The use of the telephone system may simply be denied the fraud box user by cancelling his call and entering an identifying code (flag signal) on the tape 109 of the billing equipment 108. This procedure may lead to the identification and possible future prosecution of the fraud perpetrator.

Alternatively, there is provided an MF receiver 110 connectable to the AMA trunk by means of a switch 111 controlled by the common controlling means 106. When the fraudulent proceed-to-send signal is detected, the switch 111 is actuated to connect the MF receiver 110 to the AMA trunk 101 for a maximum time interval of 30 seconds. Since the MF register/sender 24 at the destination office will time out 25 seconds after a proceed-to-send signal has been initiated, the 30 seconds timing of the MF receiver 110 insures that if the perpetrator does not key his second-called number within that interval of time, he will have to request service again and the detection process will be repeated. As the fraud box user transmits the second-dialled MF signals, they are received at receiver 110 and are then transferred to the billing equipment 108 and the memory tape 109 together with a coded entry (flag signal) denoting the existence of a fraudulent call. The call may then be allowed to proceed. In this case, the fraud box user is identified as is the destination of his fraudulent call. The user may therefore be charged correctly for his call.

The circuitry necessary to embody the invention has not been described to the schematic diagram level because the functions performed thereby may be achieved using well known circuits. For example, the MF receiver 110 may be of the type commonly used in toll offices to receive MF signalling, whereas the switch 11 may be an electromechanical switch such as relay or a semiconductor switch using transistors.

Although the invention has been described using the embodiment of a stored program switching system, it should be realized that it is equally applicable to electromechanical switching systems. The timing detection may be achieved simply by connecting the required timing circuits of any well-known conventional design to the automatic message accounting trunk circuit of the originating office and of providing an MF receiver as described above. The weird logic for controlling the operation of this new combination of elements may be easily implemented once the content of this disclosure is known.

The invention provides a reliable method and apparatus for detecting fraudulent toll telephone calls, and which may be implemented economically in existing telephone toll offices whether they are of the stored program electronic switching system type or of the electromechanical type.

What is claimed is:

1. In a telephone system comprising an originating office, and a destination office connected to said originating office via a transmission path, said originating office comprising a toll call processing system and an automatic message accounting system including at least one automatic message accounting trunk circuit connected to said call processing system, and wherein control signalling between said offices comprises using the predetermined presence or absence of a single frequency signal on said transmission path including a proceed-to-send signal transmitted from said destination office to said originating office, a method of detecting a fraudulent toll telephone call comprising the step of detecting a supervisory signal at the automatic message accounting trunk circuit, said supervisory signal corresponding to a second proceed-to-send signal from the destination office.

2. A method as defined in claim 1 comprising the further step of causing a coded entry associated with the call in progress to be entered into the billing information memory means of the automatic message accounting system in response to said detection.

3. A method as defined in claim 1, comprising the further step of connecting a multifrequency receiver to said automatic message accounting trunk circuit in response to said detection.

4. A method as defined in claim 3, comprising the additional step of transferring the dialling information received by the multifrequency receiver to the billing information memory means of the automatic message accounting system.

5. A method as defined in claim 4 comprising the further step of providing the billing information memory means of the automatic message accounting system with a flag signal associated with the call in progress in response to said detection.

6. In a telephone system comprising an originating office, a destination office connected to said originating station via a transmission path and wherein control signalling between said offices comprises using the predetermined presence or absence of a single frequency signal on said transmission path including a proceed-to-send signal transmitted from said destination office to said originating office, a method of detecting a fraudulent toll call comprising the step of detecting the presence of a second proceed-to-send signal at said originating office during any one call.

7. A telephone system comprising in combination, an originating office and a destination office connectable together via a transmission path, the originating office comprising a toll call processing system including an outgoing single frequency circuit and an automatic message accounting system including an automatic message accounting trunk circuit, the destination office comprising an incoming single frequency signalling circuit, wherein control signalling between said originating and destination offices is achieved using the predetermined presence or absence of a single frequency signal on said transmission path including a proceed-to-send signal transmitted from said destination office to said originating office, and means for detecting the presence of a second proceed-to-send signal appearing at said originating station during any one call.

8. A telephone system as defined in claim 7 and further comprising means responsive to a signal from said detection means for causing a coded entry associated with the call in progress to be entered into the billing information memory means of the automatic message accounting system.

9. A telephone system as defined in claim 7 wherein said detection means comprises means for acknowledging the presence of said second proceed-to-send signal at said automatic message accounting trunk circuit.

10. A telephone system as defined in claim 7 further comprising, a multifrequency receiver circuit and means for connecting said receiver circuit to said automatic message accounting trunk circuit in response to said acknowledgement of the presence of said second proceed-to-send signal.

11. A telephone system as defined in claim 9, further comprising, means for generating and storing a flag signal associated with the call in progress in the billing information memory means of said automatic message accounting system in response to said acknowledgement of the presence of said second proceed-to-send signal.

* * * * *